(12) United States Patent
Laroche (10) Patent No.: US 11,933,191 B2
(45) Date of Patent: Mar. 19, 2024

(54) CURVIC TYPE COUPLING FOR TURBOMACHINE WITH LOCKING

(71) Applicant: SAFRAN AIRCRAFT ENGINES, Paris (FR)

(72) Inventor: Clement Raphael Laroche, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/549,491

(22) Filed: Aug. 23, 2019

(65) Prior Publication Data

US 2020/0072054 A1 Mar. 5, 2020

(30) Foreign Application Priority Data

Aug. 29, 2018 (FR) ...................................... 18 57740

(51) Int. Cl.
*F01D 5/02* (2006.01)
*F01D 5/06* (2006.01)
*F16D 1/02* (2006.01)

(52) U.S. Cl.
CPC ............. *F01D 5/026* (2013.01); *F01D 5/066* (2013.01); *F16D 1/02* (2013.01); *F05D 2220/30* (2013.01);
(Continued)

(58) Field of Classification Search
CPC .......... F01D 5/026; F01D 5/066; F01D 15/08; F05D 2250/182–184; F05D 2260/36; F05D 2260/39; F16D 1/02; F04D 29/644
See application file for complete search history.

(56) References Cited

U.S. PATENT DOCUMENTS 2,672,013 A 3/1954 Lundquist
6,416,246 B1 * 7/2002 Boeck ..................... F01D 5/066
403/337
(Continued)

FOREIGN PATENT DOCUMENTS

DE 10 2014 225 975 A1 7/2015
DE 102014225975 A1 * 7/2015 ............. F01D 5/026
(Continued)

OTHER PUBLICATIONS

French Preliminary Search Report dated May 10, 2019 in French Application 18 57740, filed on Aug. 29, 2018 (with English Translation of Categories).

*Primary Examiner* — Topaz L. Elliott
*Assistant Examiner* — Jesse M Prager
(74) *Attorney, Agent, or Firm* — Oblon, McClelland, Maier & Neustadt, L.L.P.

(57) ABSTRACT

A coupling for a turbomachine, including a first and a second disc attached along an axis, and extending in majority respectively from a first and from a second side of a median plane normal to the axis, the first and the second discs being provided respectively with first and second teeth mutually engaging through the median plane to form a curvic connection. Several first teeth each include a first protuberance jutting out towards the axis while extending from the second side; several second teeth each include a second protuberance jutting out towards the axis of rotation while extending from the first side; the first protuberances are spaced apart from the second protuberances along the axis; at least one blocking member is brought to be supported against the first and second protuberances to block axially the first element relatively to the second element.

20 Claims, 5 Drawing Sheets

(52) U.S. Cl.
CPC ...... *F05D 2240/80* (2013.01); *F05D 2260/36* (2013.01)

(56) References Cited

U.S. PATENT DOCUMENTS

| | | | |
|---|---|---|---|
| 2013/0336785 A1* | 12/2013 | Hummel | F01D 5/026 |
| | | | 415/220 |
| 2015/0322961 A1 | 11/2015 | Slotman | |
| 2017/0191369 A1* | 7/2017 | Partyka | F04D 29/083 |
| 2017/0268352 A1* | 9/2017 | Oren | F01D 5/082 |
| 2019/0195079 A1* | 6/2019 | Cigal | F01D 11/04 |

FOREIGN PATENT DOCUMENTS

| | | |
|---|---|---|
| FR | 902.004 A | 8/1945 |
| KR | 10-1842798 B1 | 3/2018 |

* cited by examiner

CURVIC TYPE COUPLING FOR TURBOMACHINE WITH LOCKING

TECHNICAL FIELD

The invention relates to the coupling of two rotating elements such as discs bearing bladings in a turbomachine engine or analogous such as a turbojet, by means of a "curvic" type connection.

PRIOR ART

In such an engine, external air is admitted into an inlet duct to pass through a fan comprising a series of rotating blades before splitting into a central primary stream and a secondary stream surrounding the primary stream.

The primary stream next passes through a high pressure compressor before arriving in a combustion chamber, after which it expands while successively passing through a high pressure turbine and a low pressure turbine before being discharged while generating after recovery of energy for driving the fan and while generating thrust. The secondary stream is for its part directly propelled rearwards by the fan for it also to generate thrust.

To enable the recovery of energy, the high pressure turbine is rotationally connected with the high pressure compressor to rotationally drive it, and the fan is rotationally connected with the low pressure turbine by which it is rotationally driven, the main part of the thrust being generated by the fan.

The parts of the compressor or turbines of such an engine usually comprise several stages formed by rotating elements rotationally integral with each other to turn around an axis of rotation AX of the engine.

Figure 1:
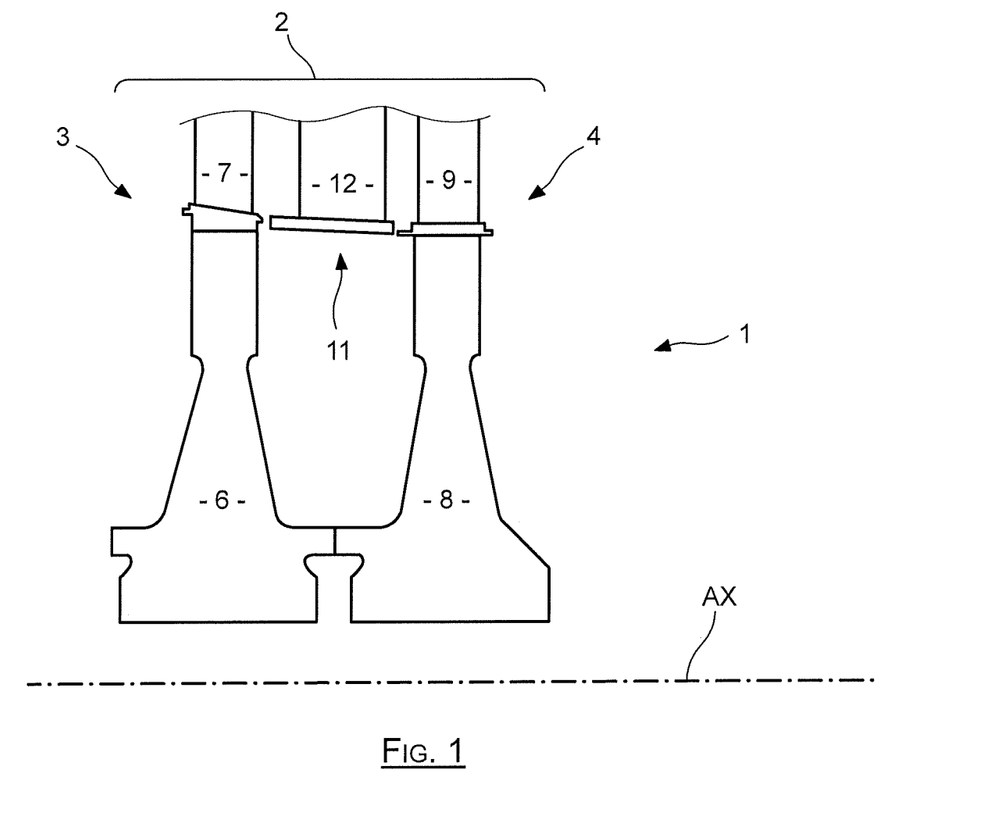
FIG. 1 already described is a sectional view of a portion of known high pressure turbine.

In this context, FIG. 1 shows a high pressure turbine 1 including a part 2 including a first stage 3 and a second stage 4 downstream of the first stage with respect to the direction of circulation of the stream. The first stage 3 comprises a first disc 6 bearing a first series of blades 7, the second stage comprising a second disc 8 bearing a second series of blades 9. A distributor 11 formed of a series of fixed blades 12 is interposed between the first series of moveable blades and the second series of moveable blades. Each disc includes a central opening and bears blades on its outer periphery.

As may be seen in this FIG. 1, the first disc 6 is attached to the second disc 8 along the axis AX, and it is rotationally coupled to this first disc by a "curvic coupling" type connection, also called dog or trapezoidal tooth connection.

Figure 2:
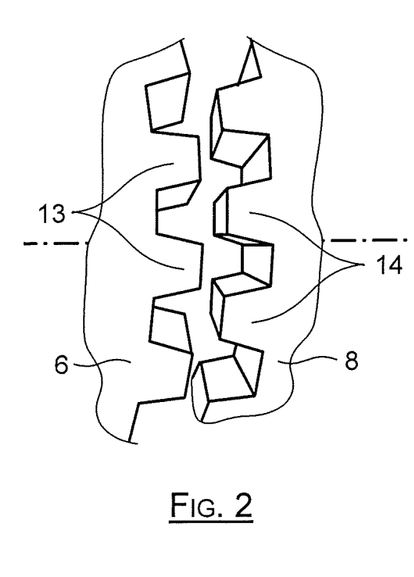
FIG. 2 already described is a perspective view of a portion of known curvic type connection.
Figure 3:
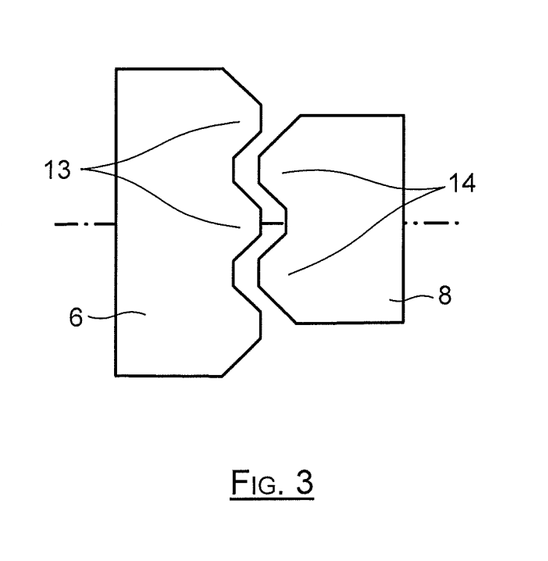
FIG. 3 already described is a schematic flat view of a portion of known curvic type connection.

The connection of the two discs, which appears more clearly in FIGS. 2 and 3, comprises first trapezoidal teeth 13 borne by the first disc 6 which are oriented towards the second disc 8, and second trapezoidal teeth 14 borne by the second disc while being oriented towards the first disc 6.

In the case of FIGS. 2 and 3, the first and the second discs are uncoupled while being spaced apart from each other, which makes it possible to reveal their teething. When the arrangement is in service as in the case of FIG. 1, the discs are coupled due to the fact that they are applied one against the other, the first teeth being engaged with the second teeth according to a mortise-slot type assembly making it possible to transfer torque from one disc to the other.

The choice of a coupling by curvic connection notably enables the discs to centre themselves independently of each other around the axis of rotation while in operation, while efficiently transferring torque from one disc to the other.

This coupling also makes it possible to facilitate the assembly of the rotor of which the discs that compose it form part while having limited bulk.

Figure 4:
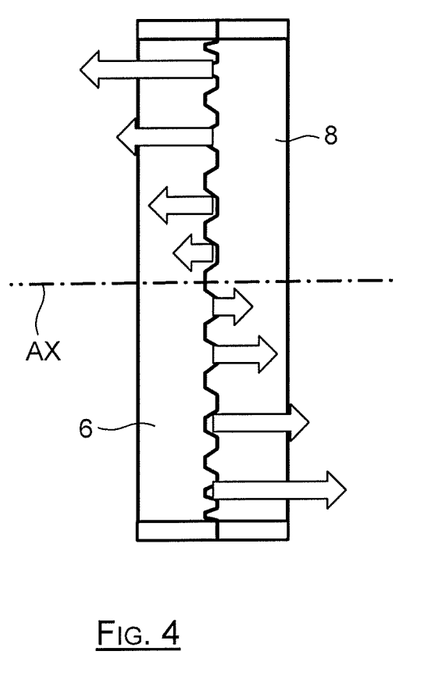
FIG. 4 already described is a lateral view showing an unbalance of the distribution of forces in a known curvic connection in the event of loss of a blade.
Figure 5:
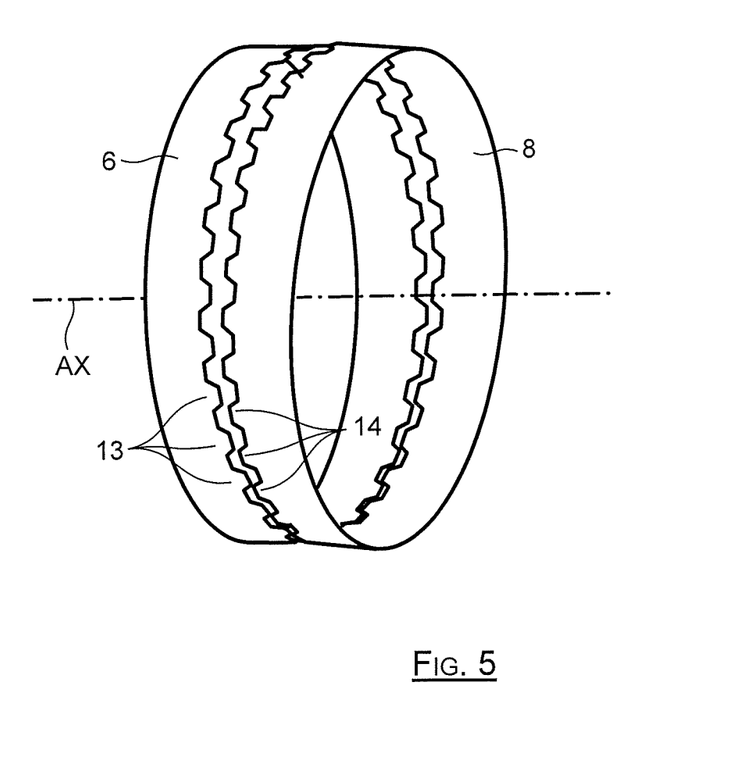
FIG. 5 already described is a perspective view showing an uncoupling of a known curvic connection.

However, if one of the discs loses one of the blades that it bears, the axial forces to which it is subjected become unbalanced, as schematically illustrated in FIG. 4. In practice, the disc having lost one or several blades then tends to be inclined with respect to its nominal orientation, which may lead to an uncoupling of the two discs, illustrated in FIG. 5. In the event of uncoupling, the disc can enter into an overspeed state which can lead to its explosion and/or its coming out of the engine.

The aim of the invention is to provide a solution making it possible to avoid the uncoupling of a curvic type interdisc connection, notably in the event of loss of a blade.

DESCRIPTION OF THE INVENTION

To this end, the subject matter of the invention is a coupling for turbomachine between a first element and a second element which extends around an axis while being engaged one with the other along the axis, each element including teeth which extend axially to be engaged axially in a respective concavity of the other element, characterised in that it comprises at least one blocking member which cooperates with blocking means borne by the teeth of the first and the second elements to block axially the first element with respect to the second element.

With this solution, the uncoupling of the first and second elements is prevented in the axial direction, which is notably efficient for avoiding phenomena of overspeed which can lead to damage of the turbomachine rotor in the event of separation between these two elements during operation. In addition, the bulk of the blocking means is limited by the fact that they are as close as possible to the coupling teething.

The subject matter of the invention is also a coupling thereby defined, in which:
several teeth of the first element each comprise a first retention face;
several teeth of the second element each comprise a second retention face;
the at least one blocking member extending between the first and the second retention faces to block axially the first element with respect to the second element.

The subject matter of the invention is also a coupling thereby defined, in which the first retention faces and the second retention faces are flat and in contact with the blocking member. The subject matter of the invention is also a coupling thereby defined, in which each retention face is formed by a protuberance prolonging a tooth, and in which each protuberance has a rectilinear shape of radial orientation directed towards the axis.

The subject matter of the invention is also a coupling thereby defined, in which the blocking member is a split ring.

The subject matter of the invention is also a coupling thereby defined, in which certain first and second teeth are devoid of protuberance.

The subject matter of the invention is also a coupling thereby defined, in which the blocking member includes a cylindrical bottom prolonged externally by a rib engaging between the first and second retention faces.

The subject matter of the invention is also a coupling thereby defined, in which the cylindrical bottom of the blocking member is prolonged axially by a first and by a second flank which are axially prolonged respectively by a first and by a second cylindrical edge, this first and this second cylindrical edge pressing respectively against a first and against a second cylindrical inner face respectively of the first and the second elements.

The subject matter of the invention is also a coupling thereby defined, in which the cylindrical edges each bear an annual leak tight seal.

The subject matter of the invention is also a turbine including a coupling thereby defined.

The subject matter of the invention is also a turbomachine including a turbine thereby defined.

DETAILED DESCRIPTION OF PARTICULAR EMBODIMENTS

The basic idea of the invention is to benefit from the alternating overlapping of the teething of the curvic connection to maintain an annular blocking member by excrescences jutting out beyond the teeth radially towards the axis.

Figure 6:
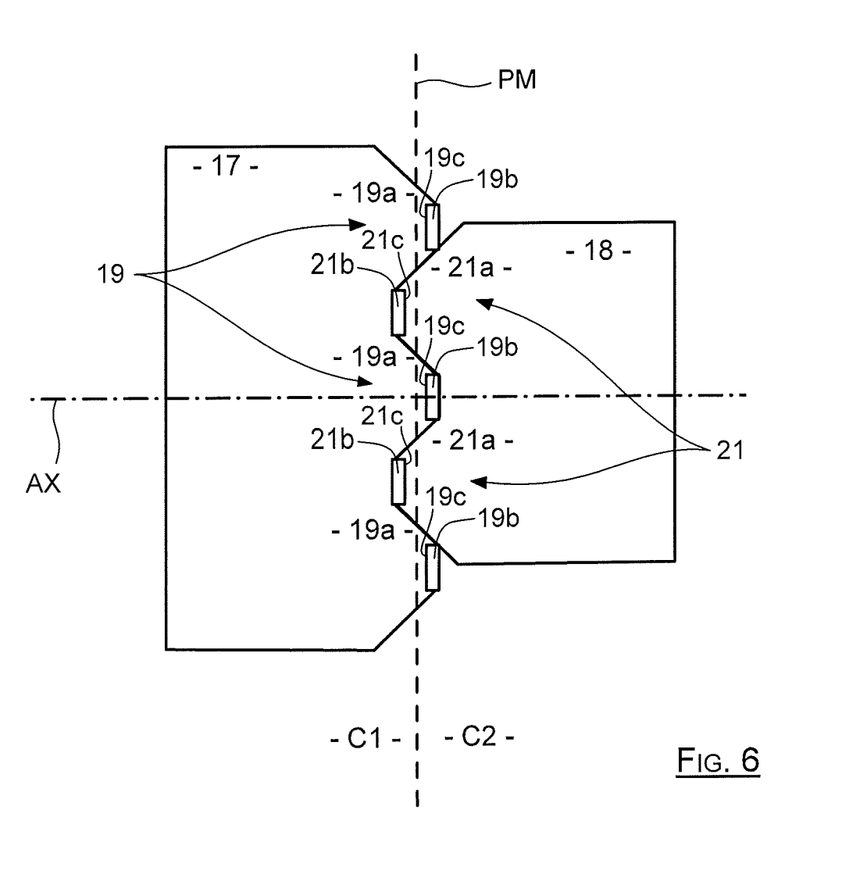
FIG. 6 is a schematic flat view of a portion of curvic connection according to the invention.

In FIG. 6, a schematic flat view of a portion of a curvic type connection 16 according to the invention ensures the coupling of a first disc 17 with a second disc 18 which turn around an axis AX while being attached one to the other along this axis.

The first disc 17 bears on one of its faces first teething extending along a crown centred on the axis AX, said first teething being formed by first trapezoidal teeth 19 regularly spaced apart which are oriented towards the second disc 18.

The second disc 18 bears on one of its faces teething extending along a crown centred on the axis AX, said second teething being formed by second trapezoidal teeth 21 regularly spaced apart and oriented towards the first disc 17.

Each tooth 19 of the first disc 17 comprises a main trapezoidal profile 19a oriented axially and directed towards the second disc, and a protuberance 19b which juts out beyond one end of this main profile 19a while extending towards the axis AX. In the same way, each tooth 21 of the second disc 18 comprises a main trapezoidal profile 21a oriented axially and directed towards the first disc, and a protuberance 21b which juts out beyond one end of this main profile while extending towards the axis AX.

The rotational coupling of the first disc 17 with the second disc 18 is ensured by fitting together the main profiles 19a, 21a which constitute the actual teeth, and through which torque is transferred from one disc to the other when the assembly is in service. Each tooth is thereby engaged in a concavity delimited by the interval separating two consecutive teeth of the other disc.

Each first protuberance 19b defines a trapezoidal profile 19a of a first tooth 19 belonging to the first disc and which is oriented towards the axis AX, a cylindrical inner face 22 being common to the first teeth 19. In an analogous manner, each second protuberance 21b defines a trapezoidal profile 21a of a second tooth 21 belonging to the second disc and which is oriented towards the axis AX, a cylindrical inner face 23 being common to the second teeth 21.

Figure 7:
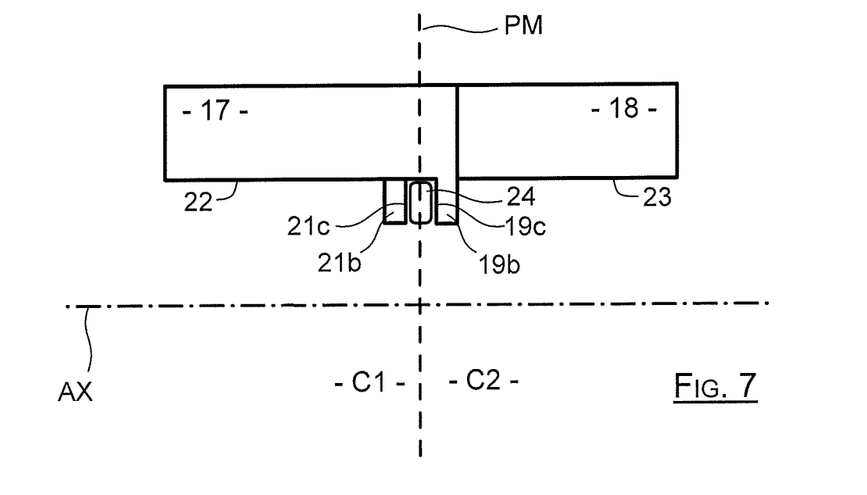
FIG. 7 is a schematic sectional view of a curvic connection according to the invention.

As may be seen in FIGS. 6 and 7, each first protuberance 19b forms a first flat retention face 19c and normal to the axis AX turned towards the first disc 17, and in an analogous manner each second protuberance 21b forms a second flat retention face 21c and normal to the axis AX turned towards the second disc 18.

The first retention faces 19c and the second retention faces 21c are arranged in an alternating manner on either side of a median plane PM normal to the axis AX. This median plane PM corresponds to the average coupling plane: the first disc 17 is situated essentially on a first side C1 of the plane PM, and the second disc is situated essentially on a second side C2 of the plane PM, opposite to the first. The faces 19c all extend in a region situated on the second side C2 and the faces 21c all extend in a region situated on the first side C1.

The first trapezoidal profiles pass through the median plane PM, such that the first retention faces 19c extend from the second side C2. And in an analogous manner, the second trapezoidal profiles 21a pass through the median plane PM, such that the second retention faces 21c extend from the first side C1.

The first retention faces 19c are spaced apart from the second retention faces 21c along the axis AX, so as to delimit between them a circumferential groove of which the bottom is constituted by the cylindrical inner faces 22 and 23. This groove receives a blocking member 24 which, in the example of the figures, is an annular band making it possible to lock the connection.

Figures 8, 9, 10:
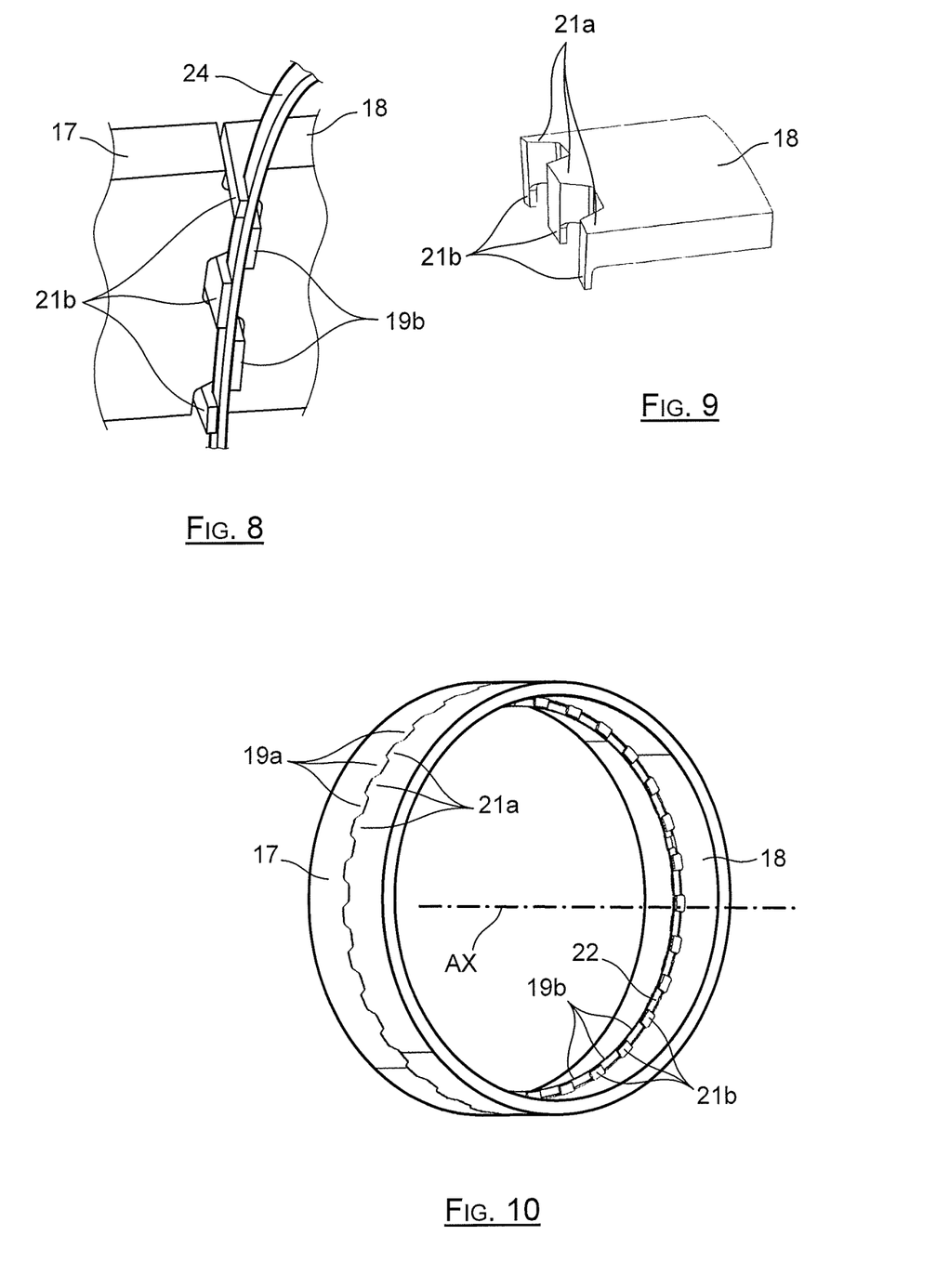
FIG. 8 is a perspective view of a portion of curvic connection according to the invention.
FIG. 9 is a perspective view of a portion of second teething of the connection according to the invention.
FIG. 10 is a perspective view of half of a curvic connection according to the invention.

As may be seen notably in FIGS. 8 and 9, each first protuberance 19b has a rectilinear shape and extends radially towards the axis AX, and in an analogous manner each second protuberance 21b has a rectilinear shape and extends radially towards the axis AX.

When the assembly is mounted as in FIGS. 8 and 10, the band 24 extends between the first and the second protuberances arranged in staggered rows. The band 24 is thereby interposed axially between the first retention faces 19c and the second retention faces 21c to block them with respect to each other along the axis AX, while forming therewith a locking opposing any moving away of the first disc with respect to the second disc.

The band 24 is also blocked radially: on the one hand by the inner faces 22 and 23 against which it is supported and which oppose its radial expansion by centrifugal effect.

The assembly constituted by the band 24 and the protuberances 19b, 21b thereby forms a stable locking of the curvic connection which prohibits the axial disengagement thereof, while being demountable for example for an operation of maintenance of the engine or instead for its mounting.

In the example of the figures, each tooth is provided with a protuberance, but only a part of the teeth may be provided with such protuberances, for example one tooth out of two or one tooth out of three. In practice, the connection comprises a minimum of three first protuberances prolonging three first teeth and three second protuberances prolonging three second teeth.

Once the first disc 17 has been brought against the second disc 18, to engage the first teething with the second teething, an operator engages one end of the band 24 in the annular groove delimited by the protuberances 19b, 21b, and he pushes this band radially into this groove until it is integrally housed therein.

The blocking member 24 here has a general shape of split ring, of rectangular section, while having two ends slightly distant from each other.

This band 24 is advantageously manufactured in a material having an appropriate flexibility to enable an operator to tighten it and to deploy it radially so as to engage it between the protuberances.

In the example of the figures the blocking member is a single annular band engaged in the groove delimited by the retention faces. The connection according to the invention may also be blocked by several blocking members each coming to be positioned between several first and second retention faces.

These blocking members are then situated circumferentially one following another in the groove delimited by the retention faces, while being maintained by the support exerted by the retention faces and by centrifugal effect when the engine runs. These blocking members may be in the form of several complementary portions of bands of which the ends are joined or spaced apart from each other when they are in place.

The fact of using one or more blocking members globally forming an inner band interposed axially between the protuberances ensures that the discs conserve the possibility of centring themselves independently of each other on the axis AX, while guaranteeing that they cannot uncouple.

Figures 11, 12, 13:
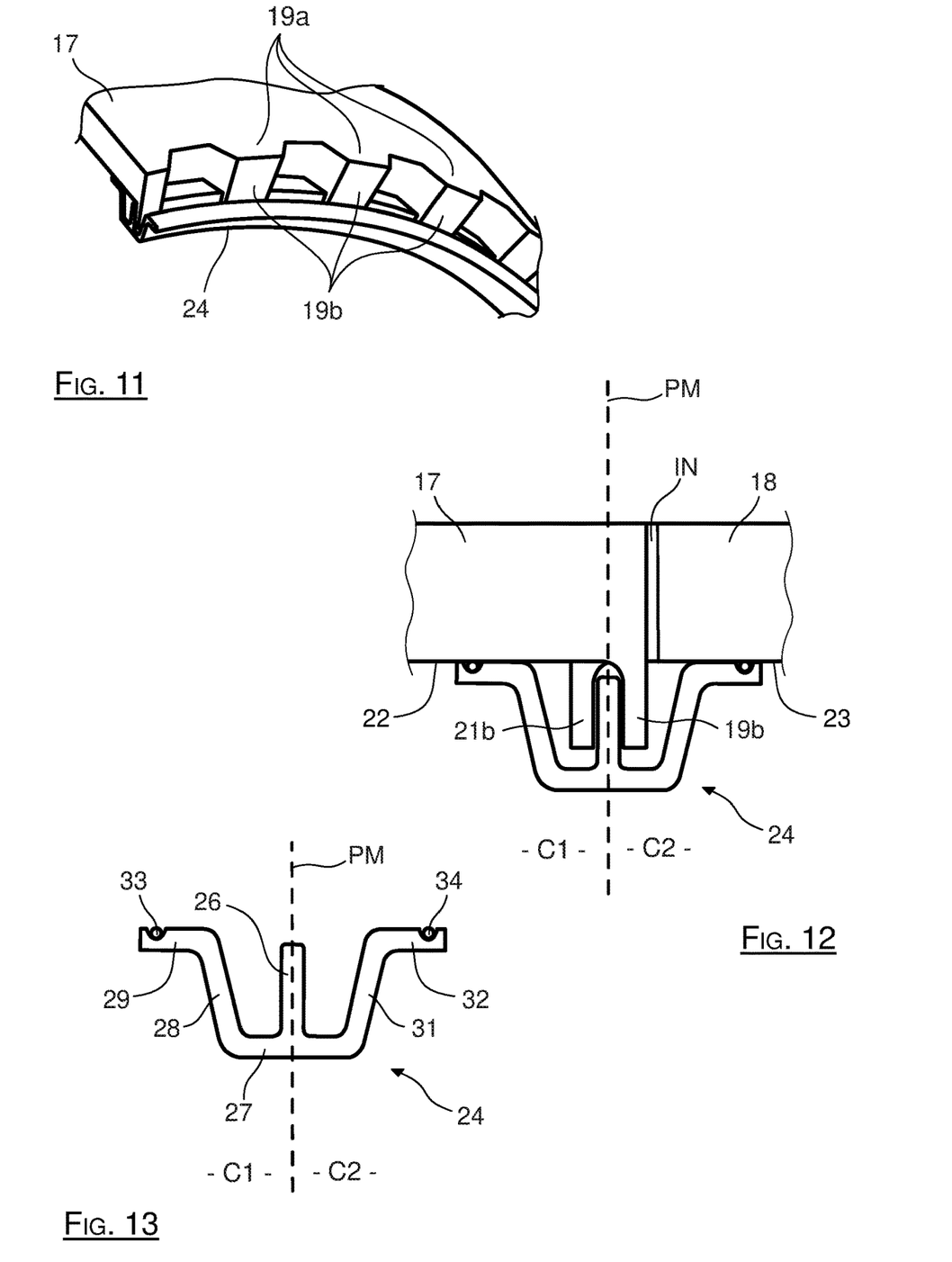
FIG. 11 is a perspective view of a portion of first teething of the connection according to the invention with an alternative blocking member.
FIG. 12 is a partial view in section of the connection according to the invention showing the section of the alternative blocking member.
FIG. 13 is a view in section of the alternative member represented alone.

In an alternative illustrated in FIGS. 11 and 12, the blocking member 24 has a section not rectangular but having a shape approximately corresponding to that of the letter W, for form a seal opposing the passage of fluid through the interstices present between the first teeth and the second teeth when they are engaged in each other. Such an interstice appears in FIG. 12 where it is marked by IN.

As may be seen in FIG. 12, the alternative member 24 comprises a crown shaped central rib borne by a bottom prolonged by two flanks each terminated by an edge or flap.

The central rib 26 has a flat crown shape with rectangular section extending in the median plane PM when the assembly is mounted, and it juts out radially outwards from a bottom 27 being in the form of a cylindrical wall while being situated at mid-length from this bottom 27, the assembly being coaxial to the axis AX.

The bottom 27 which delimits the inner face of the member 24 extends over half of the first side C1, and over half of the second side C2. This bottom 27 is prolonged from the first side C1 by a first tapered flank 28 which is itself prolonged by a first cylindrical edge 29, or flap, supported on a first cylindrical inner face 22 of the first disc 17, from which leave the first teeth 19.

In an analogous manner, this bottom 27 is prolonged on the second side C2 by a second tapered flank 31 which is itself prolonged by a cylindrical edge 32, or flap supported on a second cylindrical inner face 23 of the second disc 18 from which leave the second teeth 21.

The blocking member 24 of the alternative of FIGS. 11 to 13 has a revolution shape around the axis AX, and it is symmetrical with respect to the plane PM when observed in place, that is to say when it is engaged in the connection to block it. It also has a general shape of split ring having sufficient flexibility to enable the mounting thereof.

The first cylindrical edge 29 comprises an outer face also cylindrical which is provided with a groove in which is installed a first O-ring 33. In an analogous manner, the second cylindrical edge 32 comprises on its cylindrical outer face a gorge in which is mounted a second O-ring 34.

Thanks to these seals 33, 34, when the blocking member 24 is in place, it establishes a leak tight continuity of the inner face 22 of the first disc 17 up to the inner face 23 of the second disc 18, by covering in a leak tight manner the teething 19 and 21 engaged with each other. In these conditions, air can no longer pass through the interstices IN situated at the heads of the teeth.

The mounting of this alternative member 24 is analogous to the mounting of the blocking member of FIGS. 8 and 9: once the two discs 17 and 18 have been attached, an operator seizes the member 24 while drawing it closer to him to reduce temporarily its outer diameter. The operator then places this member 24 at the level of the plane PM, then engages its central rib 26 between the first teeth 19 and the second teeth 21, until the edges 29 and 32 bearing the seals 33 and 34 are supported on the inner faces 22 and 23 over the whole circumference of this member 24.

The invention claimed is:

1. A coupling for a turbomachine between a first element and a second element which extends around an axis while being engaged with each other along the axis, each element including teeth which extend axially to be engaged axially in a respective concavity of the other element, said coupling comprising:
    at least one blocking member which cooperates with the teeth of the first and the second elements to block axially the first element with respect to the second element, wherein
    the at least one blocking member having a W-shape includes a bottom in the form of a cylindrical wall and a ring shaped central rib, and
    the ring shaped central rib juts out radially outwards from the bottom while being situated at mid-length of the bottom, the ring shaped central rib engaging between retention faces of the teeth.

2. The coupling according to claim 1, wherein
    several teeth of the first element each comprise a first retention face of the retention faces,
    several teeth of the second element each comprise a second retention face of the retention faces, and
    the at least one blocking member extending between the first and the second retention faces blocks axially the first element with respect to the second element.

3. The coupling according to claim 2, wherein the first retention faces and the second retention faces are flat and in contact with the at least one blocking member.

4. The coupling according to claim 2, wherein
    each of the first retention faces and the second retention faces is formed by a protuberance prolonging a tooth of the several teeth of the first element and the several teeth of the second element, each protuberance is part of said teeth, and each protuberance has a rectilinear shape of radial orientation directed towards the axis.

5. The coupling according to claim 3, wherein the at least one blocking member is a split ring.

6. The coupling according to claim 3, wherein certain of the first and second teeth are devoid of a protuberance having a rectilinear shape of radial orientation directed towards the axis.

7. The coupling according to claim 6, wherein a cylindrical bottom of the at least one blocking member is prolonged axially by a first and by a second side which are axially prolonged respectively by a first and by a second cylindrical edge, said first and said second cylindrical edge pressing respectively against a first and against a second cylindrical inner face respectively of the first and the second elements.

8. The coupling according to claim 7, wherein the cylindrical edges each bear an annular leak tight seal.

9. A turbine comprising a coupling according to claim 1.

10. A turbomachine comprising a turbine according to claim 9.

11. A coupling for a turbomachine between a first element and a second element which extends around an axis while being engaged with each other along the axis, each element including teeth which extend axially to be engaged axially in a respective concavity of the other element, said coupling comprising:
at least one blocking member which cooperates with blocking means borne by the teeth of the first and the second elements to block axially the first element with respect to the second element, wherein
the at least one blocking member includes a cylindrical bottom prolonged externally by a ring shaped central rib, and
the ring shaped central rib juts out radially outwards from the bottom while being situated at mid-length of the bottom, the ring shaped central rib engaging between the blocking means of the teeth.

12. The coupling according to claim 11, wherein
several teeth of the first element each comprise a first retention face of the retention faces,
several teeth of the second element each comprise a second retention face of the retention faces,
the at least one blocking member extending between the first and the second retention faces blocks axially the first element with respect to the second element and the blocking means comprises the first retention face and the second retention face.

13. The coupling according to claim 12, wherein the first retention faces and the second retention faces are flat and in contact with the at least one blocking member.

14. The coupling according to claim 12, wherein
each of the first retention faces and the second retention faces is formed by a protuberance prolonging a tooth of the several teeth of the first element and the several teeth of the second element,
each protuberance is part of said teeth, and
each protuberance has a rectilinear shape of radial orientation directed towards the axis.

15. The coupling according to claim 13, wherein
the at least one blocking member is a split ring, or
certain of the first and second teeth are devoid of a protuberance having a rectilinear shape of radial orientation directed towards the axis.

16. The coupling according to claim 15, wherein a cylindrical bottom of the at least one blocking member is prolonged axially by a first and by a second side which are axially prolonged respectively by a first and by a second cylindrical edge, said first and said second cylindrical edge pressing respectively against a first and against a second cylindrical inner face respectively of the first and the second elements.

17. The coupling according to claim 16, wherein the cylindrical edges each bear an annular leak tight seal.

18. A turbine comprising a coupling according to claim 11.

19. A turbomachine comprising a turbine according to claim 18.

20. A coupling for a turbomachine, comprising:
a first disk and a second disk which extends around an axis while being engaged with each other along the axis, each disk including teeth which extend axially to be engaged axially in a respective concavity of the other disk;
a first cylindrical inner face of the first disk being common to the first teeth; and
a second cylindrical inner face of the second disk being common to the second teeth, wherein
the coupling further comprises at least one blocking member which cooperates with blocking means borne by the teeth of the first and the second disks to block axially the first disk with respect to the second disk,
the blocking member includes a cylindrical bottom with a cylindrical outer surface with a ring shaped rib protruding from the cylindrical outer surface and engaging between the first and second retention faces,
the teeth of each disk have a trapezoidal profile oriented axially towards the other disk, and a protuberance which juts out beyond the end of the trapezoidal profile while extending towards the axis, the protuberances forming the blocking means, and
the blocking member is a split ring.

* * * * *

UNITED STATES PATENT AND TRADEMARK OFFICE
CERTIFICATE OF CORRECTION

| | |
|---|---|
| PATENT NO. | : 11,933,191 B2 |
| APPLICATION NO. | : 16/549491 |
| DATED | : March 19, 2024 |
| INVENTOR(S) | : Clement Raphael Laroche |

It is certified that error appears in the above-identified patent and that said Letters Patent is hereby corrected as shown below:

In the Claims

In Column 7, Claim 12, Line 49, delete "element" and insert -- element, --, therefor.

Signed and Sealed this
Twentieth Day of August, 2024

*Katherine Kelly Vidal*

Katherine Kelly Vidal
*Director of the United States Patent and Trademark Office*